United States Patent
Park et al.

(10) Patent No.: US 12,118,985 B2
(45) Date of Patent: Oct. 15, 2024

(54) ELECTRONIC DEVICE AND METHOD FOR PROVIDING ON-DEVICE ARTIFICIAL INTELLIGENCE SERVICE

(71) Applicant: Samsung Electronics Co., Ltd., Gyeonggi-do (KR)

(72) Inventors: Sangmin Park, Gyeonggi-do (KR); Gajin Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 261 days.

(21) Appl. No.: 17/833,179

(22) Filed: Jun. 6, 2022

(65) Prior Publication Data

US 2022/0301553 A1    Sep. 22, 2022

Related U.S. Application Data

(63) Continuation of application No. PCT/KR2022/000650, filed on Jan. 13, 2022.

(30) Foreign Application Priority Data

Feb. 19, 2021   (KR) .................. 10-2021-0022563

(51) Int. Cl.
*G10L 15/22*   (2006.01)
*G10L 15/08*   (2006.01)
*G10L 15/26*   (2006.01)

(52) U.S. Cl.
CPC ............ *G10L 15/083* (2013.01); *G10L 15/22* (2013.01); *G10L 15/26* (2013.01); *G10L 2015/223* (2013.01)

(58) Field of Classification Search
CPC .. G06F 3/041; G06F 3/04812; G06F 3/04883; G06F 3/167; G06F 9/453; G06F 16/907; G06F 16/955; G06F 40/40; G06F 3/013; G06F 3/017; G06F 3/0484; G06F 3/16; G06F 9/451; G06F 16/9536;
(Continued)

(56) References Cited

U.S. PATENT DOCUMENTS 8,595,016 B2 * 11/2013 Van Sciver ............. G10L 15/22
                                                            704/275
8,620,659 B2 * 12/2013 Di Cristo ............ G10L 15/1815
                                                            704/251
(Continued)

FOREIGN PATENT DOCUMENTS

JP      2019-091332      6/2019
KR      10-0832534       4/2008
(Continued)

*Primary Examiner* — Gerald Gauthier
(74) *Attorney, Agent, or Firm* — The Farrell Law Firm, P.C.

(57) ABSTRACT

An electronic device and method for providing an on-device AI service are provided herein. The electronic device includes an input module configured to receive a command or data; a display module; a memory storing a first application; and a processor configured to receive, from the input module or the display module, a user request, while the first application is executed, determine content data associated with the user request, generate request information corresponding to the user request based on the content data, determine a second application to process the user request, and transmit the request information to the second application.

14 Claims, 13 Drawing Sheets

(58) Field of Classification Search
CPC ........ G06F 40/186; G06F 40/20; G06F 40/30; G06F 40/35; G06F 40/53; G06N 3/087; G06N 20/00; G06V 10/82; G10L 15/02; G10L 15/083; G10L 15/16; G10L 15/22; G10L 15/26; G10L 17/22; G10L 2015/223; G10L 15/1815; G10L 15/183; G10L 15/19; G10L 15/222; G10L 15/30; G10L 21/06; G10L 25/84; H04L 67/535; H04L 65/613; H04M 3/4936; H04M 1/6091; B60R 16/0373; G01C 21/3608; G06Q 30/016; G06Q 30/02; G06Q 30/0633; G06Q 30/0641

See application file for complete search history.

(56) References Cited

U.S. PATENT DOCUMENTS

| | | | | |
|---|---|---|---|---|
| 8,639,513 | B2* | 1/2014 | Opaluch | G10L 17/22 704/235 |
| 8,650,030 | B2* | 2/2014 | Hafsteinsson | G10L 15/22 704/235 |
| 8,788,257 | B1* | 7/2014 | Su | G06F 40/20 704/4 |
| 8,805,690 | B1* | 8/2014 | Lebeau | H04M 1/6091 704/270.1 |
| 8,838,457 | B2* | 9/2014 | Cerra | G10L 15/30 704/275 |
| 11,620,999 | B2* | 4/2023 | Dighe | G10L 15/22 704/275 |
| 11,621,003 | B2* | 4/2023 | Alsina | H04L 67/306 704/275 |
| 11,636,855 | B2* | 4/2023 | Taylor | G10L 25/84 704/275 |
| 11,646,020 | B2* | 5/2023 | Jaiswal | G10L 15/22 704/275 |
| 11,651,770 | B2* | 5/2023 | Ramic | G06F 3/167 704/275 |
| 11,682,390 | B2* | 6/2023 | Temkin | G10L 15/22 704/275 |
| 11,689,480 | B2* | 6/2023 | Aggarwal | G06F 9/453 704/275 |
| 11,693,533 | B2* | 7/2023 | Ni | G06F 3/04812 704/275 |
| 11,694,688 | B2* | 7/2023 | Ward | G10L 15/22 704/275 |
| 11,710,482 | B2* | 7/2023 | Garcia | G10L 15/22 704/275 |
| 11,721,331 | B1* | 8/2023 | Kinsey | G06F 3/167 704/275 |
| 11,721,332 | B1* | 8/2023 | Mokady | G06Q 30/0641 704/275 |
| 11,721,340 | B2* | 8/2023 | Chen | G10L 15/22 704/275 |
| 11,727,929 | B2* | 8/2023 | Webster | G06F 40/53 704/275 |
| 11,735,157 | B2* | 8/2023 | Zoller | G06Q 30/016 704/275 |
| 11,741,952 | B2* | 8/2023 | Zhu | G06N 20/00 704/275 |
| 11,755,276 | B2* | 9/2023 | Sinesio | G06F 3/167 704/275 |
| 11,769,497 | B2* | 9/2023 | Manjunath | G10L 15/26 704/275 |
| 2002/0010646 | A1* | 1/2002 | Azuma | G06Q 30/0633 704/E15.045 |
| 2002/0019737 | A1* | 2/2002 | Stuart | G10L 15/26 704/E15.045 |
| 2003/0125958 | A1* | 7/2003 | Alpdemir | G06Q 30/02 704/E15.045 |
| 2003/0139932 | A1* | 7/2003 | Shao | G06F 9/451 704/E15.045 |
| 2004/0006478 | A1* | 1/2004 | Alpdemir | G06Q 30/02 704/E15.045 |
| 2008/0082342 | A1* | 4/2008 | Kim | H04M 3/4936 704/E15.001 |
| 2009/0089065 | A1* | 4/2009 | Buck | B60R 16/0373 704/E15.001 |
| 2009/0132255 | A1* | 5/2009 | Lu | G10L 15/222 455/563 |
| 2009/0150156 | A1* | 6/2009 | Kennewick | G01C 21/3608 704/275 |
| 2009/0150160 | A1* | 6/2009 | Mozer | G06F 3/04883 704/E15.001 |
| 2010/0042702 | A1* | 2/2010 | Hanses | H04L 65/613 709/219 |
| 2012/0022874 | A1* | 1/2012 | Lloyd | G10L 15/19 704/E21.001 |
| 2012/0209608 | A1* | 8/2012 | Lee | G06F 3/167 704/E21.001 |
| 2013/0080177 | A1* | 3/2013 | Chen | G10L 15/183 704/275 |
| 2013/0103404 | A1* | 4/2013 | Burke | G01C 21/3608 704/275 |
| 2013/0124211 | A1* | 5/2013 | McDonough | G10L 15/22 704/275 |
| 2013/0166303 | A1 | 6/2013 | Chang et al. | |
| 2013/0197915 | A1* | 8/2013 | Burke | G10L 21/06 704/275 |
| 2014/0006033 | A1* | 1/2014 | Jung | G10L 15/22 345/173 |
| 2014/0067403 | A1* | 3/2014 | Burke | G06F 3/167 704/E21.001 |
| 2014/0074483 | A1* | 3/2014 | Van Os | G10L 15/22 704/275 |
| 2014/0156282 | A1* | 6/2014 | Madere | G06F 40/30 704/275 |
| 2018/0089588 | A1 | 3/2018 | Ravi et al. | |
| 2018/0336905 | A1* | 11/2018 | Kim | G10L 17/22 |
| 2019/0147864 | A1* | 5/2019 | Lu | G10L 15/02 704/275 |
| 2019/0272459 | A1* | 9/2019 | Kim | G06F 3/013 |
| 2019/0318545 | A1* | 10/2019 | Sholudko | G06F 3/16 |
| 2019/0325081 | A1* | 10/2019 | Liu | G06F 3/017 |
| 2019/0371315 | A1* | 12/2019 | Newendorp | G06F 3/167 |
| 2020/0327155 | A1* | 10/2020 | Kim | G06F 40/186 |
| 2021/0035582 | A1* | 2/2021 | Chen | G10L 15/22 |
| 2021/0117479 | A1* | 4/2021 | Liu | G06V 10/82 |
| 2022/0301553 | A1* | 9/2022 | Park | G10L 15/22 |
| 2023/0098174 | A1* | 3/2023 | Simes | G06F 3/04883 704/275 |
| 2023/0125662 | A1* | 4/2023 | Burakov | G10L 15/22 704/275 |
| 2023/0138030 | A1* | 5/2023 | Sreedhara | G10L 15/22 704/275 |
| 2023/0161820 | A1* | 5/2023 | Lewis | G06F 40/35 704/275 |
| 2023/0169980 | A1* | 6/2023 | Carbune | G06F 3/167 704/275 |
| 2023/0197078 | A1* | 6/2023 | Bobbili | G10L 15/22 704/275 |
| 2023/0197083 | A1* | 6/2023 | Kim | G10L 15/26 704/275 |
| 2023/0222605 | A1* | 7/2023 | Natarajan | H04L 67/535 704/275 |

FOREIGN PATENT DOCUMENTS

| | | |
|---|---|---|
| KR | 10-1507662 | 3/2015 |
| KR | 1020150032055 | 3/2015 |
| KR | 1020190133100 | 12/2019 |
| KR | 10-2057629 | 1/2020 |
| KR | 1020200040625 | 4/2020 |
| KR | 10-2120751 | 6/2020 |
| KR | 10-2125225 | 6/2020 |
| KR | 1020200123945 | 11/2020 |

* cited by examiner

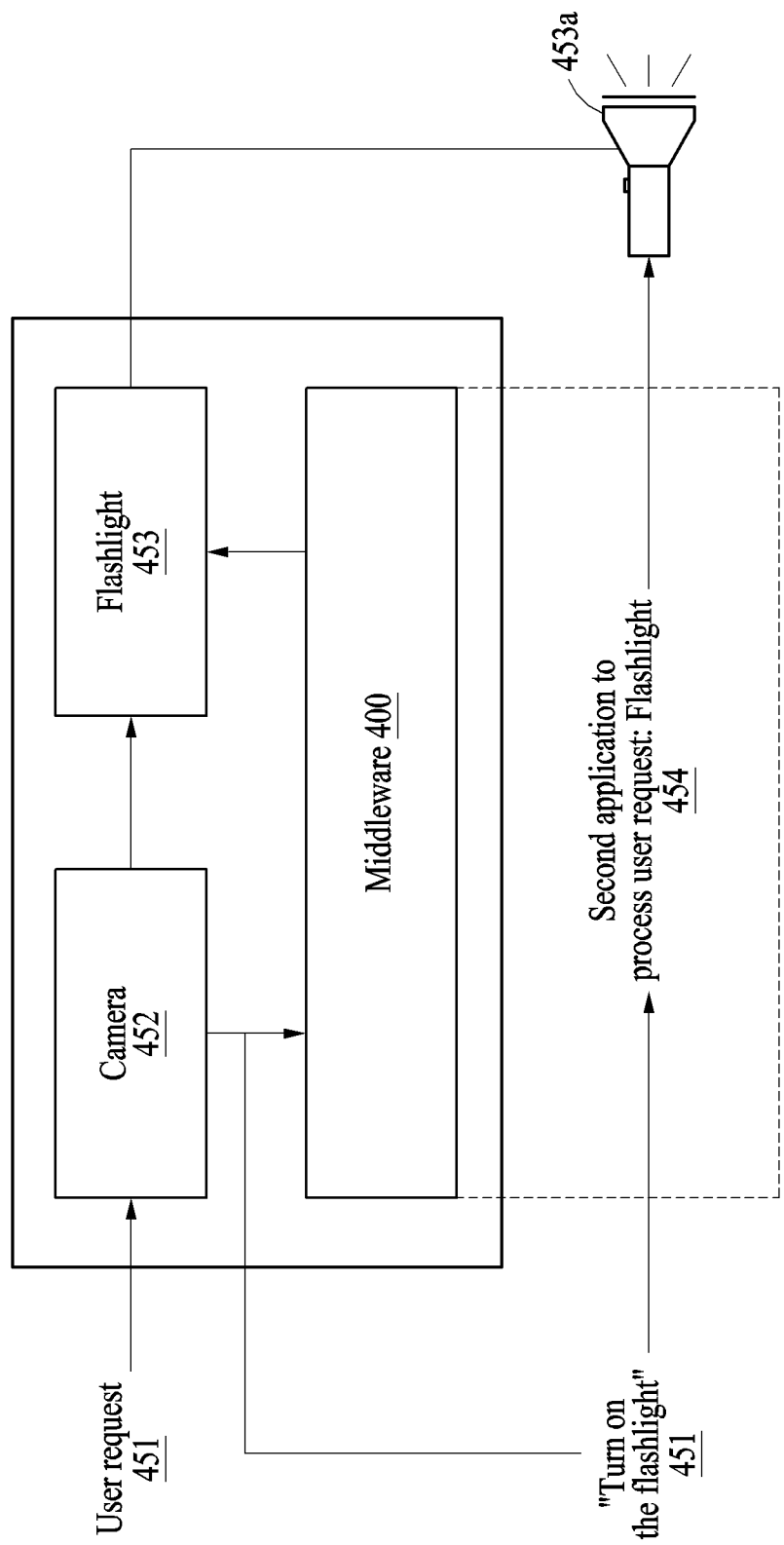

ELECTRONIC DEVICE AND METHOD FOR PROVIDING ON-DEVICE ARTIFICIAL INTELLIGENCE SERVICE

CROSS-REFERENCE TO RELATED APPLICATIONS

This application is a bypass continuation application of international Application No. PCT/KR2022/000650, which was filed on Jan. 13, 2022, and claims priority to Korean Patent Application No. 10-2021-0022563, which was filed in the Korean Intellectual Property Office filed on Feb. 19, 2021, the entire disclosure of each of which is incorporated herein by reference.

BACKGROUND

1. Field

The disclosure relates generally to an electronic device and method for providing an on-device artificial intelligence (AI) service.

2. Description of Related Art

An on-device AI service may refer to a service provided using an AI model on a terminal such as a smartphone, a desktop, or a smart watch. Conventionally, on-device AI services have been implemented in interoperation with a server to process operations of an AI model, due to limited hardware resources. AI services may also be provided for applications that operate offline.

In addition, implementing and using a separate AI model for each application that operates offline may lead to an excessive increase in development cost or storage space.

Electronic devices, such as smartphones, may provide a voice assistant (VA) service, e.g., Bixby® on a Galaxy® device or Siri® on an iPhone®. A VA service is an independent service and thus, may not provide an AI service according to a user request in a predetermined application and may cause, even when used in interoperation with the application, an increase in system complexity.

Accordingly, there is a need for technology that provides an on-device AI service, such as natural language processing, even on an application, such as "Gallery" which is for managing image files or "My Files" which is for managing files stored in a storage device.

SUMMARY

An aspect of the disclosure is to provide an electronic device and method for providing an on-device AI service using modules included in middleware, thereby providing an on-device AI service for an application that may operate offline without interoperation with a server or interoperation with a VA.

Another aspect of the disclosure is to provide an electronic device and method that does not need to process an operation for domain classification or to store a separate AI model for each application and thus, may be advantageous in terms of system complexity or storage space.

In accordance with an aspect of the disclosure, an electronic device is provided, which includes an input module configured to receive a command or data; a display module; a memory storing a first application; and a processor configured to receive, from the input module or the display module, a user request, while the first application is executed, determine content data associated with the user request, generate request information corresponding to the user request based on the content data, determine a second application to process the user request, and transmit the request information to the second application.

In accordance with another aspect of the disclosure, an electronic device is provided, which includes an input module configured to receive a command or data; a display module; a memory storing a first application; and a processor configured to receive, from the input module or the display module, a user request, while the first application is executed, analyze the user request using an artificial intelligence (AI) model trained to perform natural language processing, determine a second application to process the user request based analyzing the user request, and process the user request through the second application.

In accordance with another aspect of the disclosure, an on-device AI service method is provided, which includes receiving a user request while a first application is executed, determining content data associated with the user request, generating request information corresponding to the user request based on the content data, determining a second application to process the user request, and transmitting the content data and the request information to the second application.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
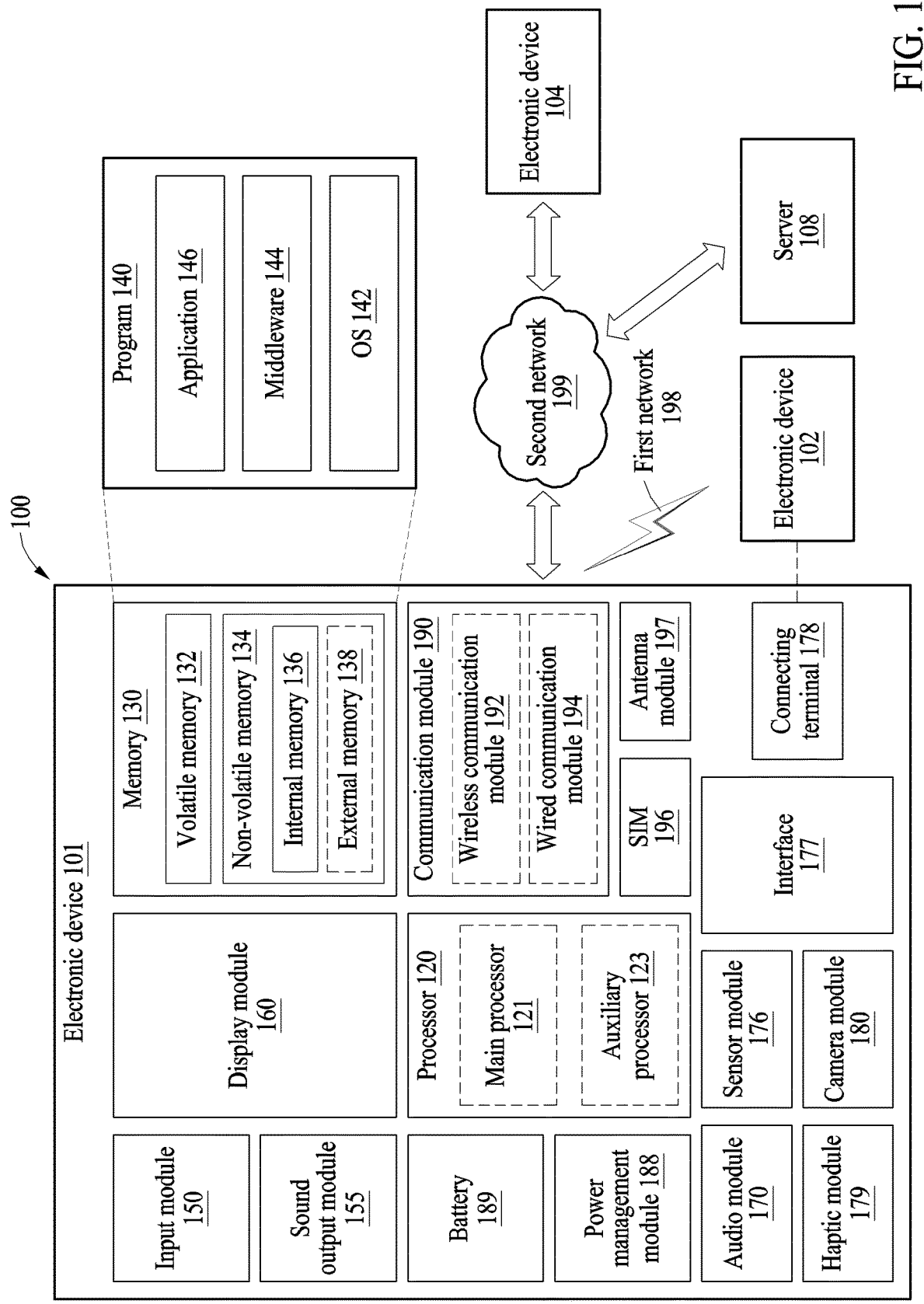
FIG. 1 illustrates an electronic device in a network environment according to an embodiment.

Hereinafter, various embodiments of the disclosure will be described in greater detail with reference to the accompanying drawings. In the accompanying drawings, like reference numerals may refer to like elements and a repeated description related thereto may be omitted.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. Alternatively, at least one of the components (e.g., the connecting to signal 178) may be omitted from the electronic device 101, or one more other components may be added in the electronic device 101. Some of the components (e.g., the sensor module 176, the camera module 180, or the antenna module 19) may be integrated as a single compo gent (e.g., the display module 160).

The processor 120 may execute, for example, software (e.g., a program 140) to control at least one other component (e.g., a hardware or software component) of the electronic device 101 connected to the processor 120, and may perform various data processing or computation. As at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or n conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the rain processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specified for AI model processing. An AI model may be generated by machine learning. Such learning may be performed by, for example, the electronic device 101 in which an AI model is executed, or performed via, a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent DNN (BRDNN), a deep Q-network, or a combination of two or more thereof, but is not limited thereto. The AI model may additionally or alternatively, include a software structure other than the hardware structure.

The memory 130 may store various data used by at least one component (e.g., the processor 120 or the sensor module 176) of the electronic device 101. The various data may include for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry) control a corresponding one of the display, the hologram device, and the projector. The display module 160 may include a touch sensor adapted to detect a touch, or a pressure sensor adapted to measure the intensity of force incurred by the touch.

The audio module 170 may convert a sound into an electric signal or vice versa. The audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). The connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, or flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5$^{th}$ generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. Alternatively, another component (e.g., a radio frequency integrated circuit (RFIC)) other than the radiating element may be additionally forged as a part of the antenna module 197.

The antenna module 197 may form a mmWave antenna, module. The mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of the same type as or a different type from the electronic device 101.

All or some of operations to be executed by the electronic device 101 may be executed at one or more of the external electronic devices 102, 104, or 108. For example, if the electronic device 101 should perform a function or a service automatically, or in response to a request from a user or another device, the electronic device 101, instead of or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another example embodiment, the external electronic device 104 may include an Internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
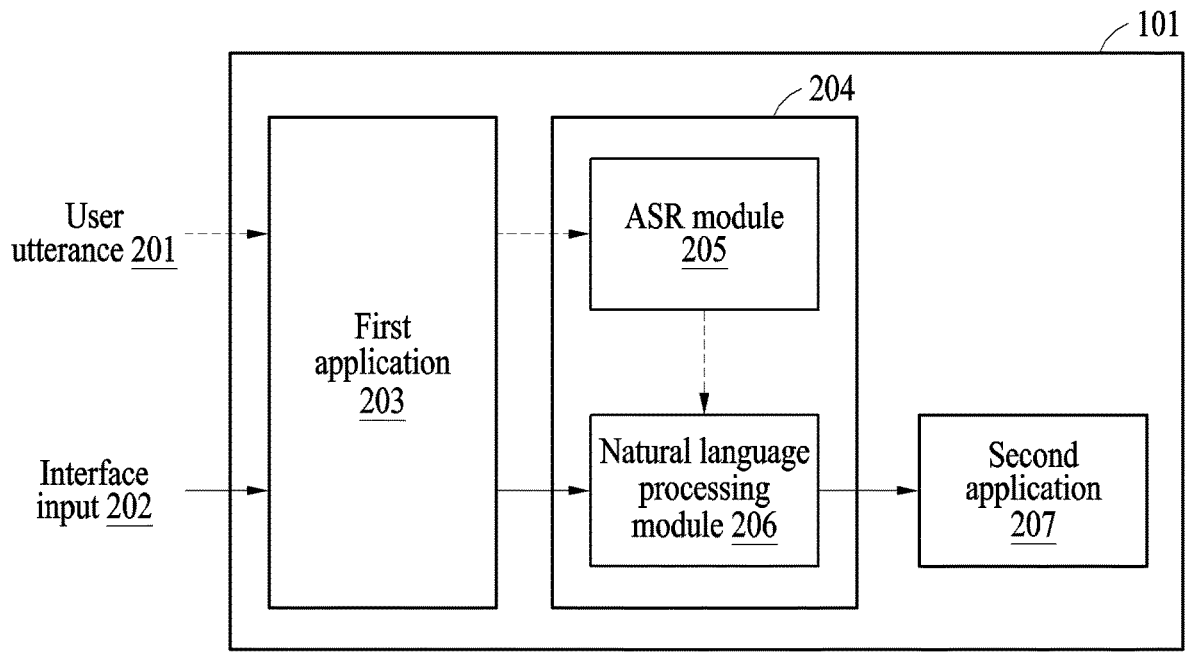
FIG. 2 illustrates an on-device AI service in an electronic device according to an embodiment.

FIG. 2 illustrates an on-device AI service in an electronic device according to an embodiment.

Referring to FIG. 2, when a first application 203 is executed in the electronic device 101 and a user utterance 201 or an interface input 202 for a user request is received by the electronic device 101, the electronic device 101 may perform natural language processing for the user request using an automatic speech recognition (ASR) module 205 and a natural language processing module 206 included in middleware 204, determine a second application 207 to process the user request, and transmit a result of performing natural language processing to the second application 207.

The electronic device 101 may use the ASR module 205 and the natural language processing module 206 included in the middleware 204 to provide an on-device AI service for an application that may operate offline, without interoperation with a server or interoperation with a VA.

More specifically, the electronic device 101 does not need to process an operation for domain classification or to store a separate AI model for each application, which may be advantageous in terms of system complexity or storage space.

The user request may be related to an action that a user intends to process in relation to the second application 207, while the first application 203 is executed.

The first application 203 may be an application that is currently executed, and the second application 207 may be for processing the user request. The first application 203 and the second application 207 may be the same application or different applications. At least one of the first application 203 and the second application 207 may be an application that may operates offline.

The user request may be an action that the user intends to process in relation to content data, e.g., a file including content such as a document, an image, an audio, or a video, which may be pre-stored in the electronic device 101.

The user request may be for retrieving, attaching, or sharing a content document, and for an action related to content data in another application. The user request may be related to an action to be processed through the second application 207, regardless of content data.

For example, the user request may be for i) retrieving an image corresponding to a search term from an application that manages images, ii) sharing images selected in an application that manages images through an email or social networking service (SNS) application, iii) sharing documents selected in an application that manages documents or execution files through an email or SNS application, iv) executing a camera application or a flashlight application, or v) attaching an image or a document for a keyword in an email or SNS application. The user request may also be converted into text, which may be analyzed and processed by the natural language processing module 206.

The user request is not limited to the examples described above, and may include various requests related to actions to be processed through the second application 207. The user request may be received through the user utterance 201 or the interface input 202, and may be received from another component of the electronic device 101 or from another electronic device 101.

When the user request is received in the form of the user utterance 201, e.g., through a microphone of the electronic device 101, the user request may be converted into a text by the ASR module 205.

The ASR module 205 may recognize the user utterance 201 and convert the user utterance 201 into text. An operation performed by the ASR module 205 may be processed by a processor. The ASR module 205 may recognize the user utterance 201, while the first application 203 is executed, and convert the user utterance 201 into text.

A method of converting the user utterance 201 into text is not limited to a specific example, and the ASR module 205 may use any available method. The ASR module 205 may transmit the text recognized from the user utterance 201 to the natural language processing module 206.

When the user inputs a search term in the first application 203 or touches a button displayed on a display of the electronic device 101, the user request may be transmitted to the electronic device 101. The user request may be received through a touch panel of the display.

When the user request is received through the touch panel, the user request may be converted into text according to an action performed by the user in the first application 203 and the button selected by the user.

For example, when the user selects content data and clicks a button (e.g., share by email, rename, share by SNS, add schedule) related to an action to be processed with the second application 207, the user request may be converted into text (e.g., "Share the selected image by email" or "Rename the selected file") corresponding to an action for the selected content data.

When the user searches for content data, the user request may be converted into text corresponding to a search term (e.g., "the photo taken with A in Busan"). When the user attaches content data included in the second application 207 in the first application 203, the user request may be converted into text corresponding to attaching the content data (e.g., "Attach images a, b, and c to email").

Natural language processing may include a computer processing natural language data by analyzing the meaning of natural language used by humans. Natural language processing may be used in fields such as speech recognition, content summary, translation, user sentiment analysis, text classification task, question and answer systems, chatbots, etc.

The natural language processing module 206 may analyze the meaning of the user request, determine content data and request information related to the user request, and determine a second application 207 to process the user request. An operation performed by the natural language processing module 206 may be processed by a processor.

The natural language processing module 206 may process the text corresponding to the user request, in order to recognize the user request, despite variations in verb tense or variations in word order. For example, AI models, such as mobileBERT and DistillBERT, may be used for text processing. However, method of processing the text is not limited to the examples described above, and various methods available to those skilled in the art may be used.

The natural language processing module 206 may determine content data associated with the user request based on the text corresponding to the user request. For example, when the user specifies content data in advance, the natural language processing module 206 may determine the specified content data as the content data associated with the user request.

When the user selects content data and inputs a user utterance 201 (e.g., "Share this by email", "Rename this file as A", "Share this by SNS", or "Add a schedule") related to an action to be processed with the second application 207, the selected content data may be determined as content data associated with the user request.

For example, when content data is not specified in advance, the natural language processing module 206 may determine text associated with the content data in the text corresponding to the user request. That is, the natural language processing module 206 may determine the text associated with the content data by comparing the text corresponding to the user request with text that is pre-stored in the memory.

The natural language processing module 206 may generate request information by analyzing the text corresponding to the user request. The request information may include any one or more of intent information and content information. The intent information may be information related to an action intended by the user or an action to be performed in the second application 207.

The natural language processing module 206 may classify the text corresponding to the user request and determine the intent information corresponding to the user request, by inputting the text corresponding to the user request to an AI model trained to classify input text and determine intent information of the input text.

The AI model may include various types of AI models (e.g., machine learning models and neural network models) capable of natural language processing. For example, the AI model provided by fastText may be determined as an AI model for classifying text and determining intent information of the input text in the disclosure.

When the user searches for content data in the first application 203 (e.g., "Find the photo taken in Busan yesterday" or "Attach the photo taken with A yesterday"), the natural language processing module 206 may determine text (e.g., "yesterday", "Busan", and "photo") associated with the content data based on a result of classifying the text corresponding to the user request (e.g., "yesterday": time, "A": person, "photo": content).

The natural language processing module 206 may determine content data associated with the user request based on the text associated with the content data. The natural language processing module 206 may determine the content data associated with the user request by comparing the text associated with the content data with content information of content data stored in the memory.

The natural language processing module 206 may determine the content data associated with the user request among the content information of the content data stored in the memory, by using a result of classifying the text associated with the content data.

The natural language processing module 206 may determine the second application 207 based on the intent information generated using the AI model trained to determine intent information with respect to input text. For example, when the user requests a search or requests to attach a file, the intent information may be related to an action to be processed by the first application 203 or the second application 207, such as "attach" or "search".

The natural language processing module 206 may generate request information corresponding to the user request based on the content data. The request information may include content information that is related to the content data.

The natural language processing module 206 may determine the content information based on a preset option according to the user request, in the first application 203. The content information may include any one or more of details information of the content data, identification information of the content data, property information of the content data, and if the content data are multiple, common information of the multiple content data.

For example, the identification information of the content data may include a uniform resource identifier (URI) of the content data. The common information of multiple content data, may include property information or detail information that is common between the multiple content data.

The natural language processing module 206 may generate the common information by extracting and clustering property information and detail information of the multiple content data. The common information may be determined among the common property information and detail information of the multiple content data according to a predetermined priority.

For example, when a plurality of images are determined as content data and there is property information and details information, such as a person, a place, and a date of creation, common between the plurality of images, the common information may include the person, the place, and the date of creation common between the plurality of images.

If the content data is an image, the property information of the content data may include a date of creation, location information at the time of creation, a size, a width, a height, a bit level, a name, an item type, a folder path, a date of modification, an owner, a sharing status, and user tagging information of the image.

If the content data is an image, the detail information of the content data may include information about an object (e.g., person, thing) recognized in the image, information about a background (e.g., place, weather) recognized in the image, and information about a text recognized in the image.

If the content data is a document, the property information of the content data may include a date of creation, a type, a location, a size, a date of modification, a file name, a date of access, an author, a manager, a company, a revision number, an editing time, a folder path, a number of pages, a number of paragraphs, a number of lines, a number of words, a number of characters, and a number of characters (with spaces) of the document. If the content data is a document, the detail information of the content data may include a title, a subject, a keyword, a category, and a summary of the document.

If the content data is an audio file, the property information of the content data may include an extension, a remark, a duration, a quality, a resolution, a capacity, a folder path, a date of creation, a file name, a date of modification, and an owner of the audio. If the content data is an audio file, the detail information of the content data may include a song title, an artist, an album, a year of album release, a genre, and a song number.

If the content data is a video, the property information of the content data may include track information, a coding type, a version, a play time, a next track ID, an average bit rate, a maximum bit rate, audio information, a resolution, a capacity, a folder path, a date of creation, and a date of modification of the video. If the content data is a video, the detail information of the content data may include a person included in the video, a story, a keyword, a background, and a thing.

The natural language processing module 206 may determine the content information based on a preset option according to the user request, in the first application 203. For example, the first application 203 may be present to generate common information between multiple content data, with respect to sharing or attaching the multiple content data. When a user request for sharing multiple content data is received, the natural language processing module 206 may generate common information of the multiple content data and determine the common information to be request information provided to the second application 207.

When a user request for sharing a plurality of images is received in the first application 203 for managing images, common information of the plurality of images may be provided to the second application 207.

The first application 203 may be preset to generate summary information of content data, with respect to sharing or attaching single content data. When a user request for sharing single content data is received, the natural language processing module 206 may extract summary information of the content data and determine the summary information to be request information provided to the second application 207.

The natural language processing module 206 may determine content information according to a user request in the first application 203. For example, when the user requests a search for content data in the first application 203, the natural language processing module 206 may determine the content data requested by the user in the second application 207 and transmit URI information of the content data.

The natural language processing module 206 may process the content information provided to the second application 207. The natural language processing module 206 may process the content information using an AI model trained to generate a sentence based on an input keyword. The AI model may generate a sentence based on a generative factor.

As the generative factor increases, the degree of processing content information may increase, and as the generative factor decreases, the degree of processing content information may decrease. As the degree of processing increases, a word or an adposition may be added, and the content information may be processed to be suitable for a general spoken or written language. As the degree of processing decreases, the content information nay be processed without modification.

For example, content information for a predetermined image may be "Sep. 1, 2020" and "Samsung Kim" In this case, a sentence generated when the generative factor is low may be "a photo taken with Samsung KIM on Sep. 1, 2020, was attached," and a sentence generated when the generative factor is high may be "the photos merrily taken during the trip to Busan with Samsung Kim in early fall of this year were attached."

The natural language processing module 206 may determine a second application 207 to process the user request. The natural language processing module 206 may determine the second application 207 based on a result of classifying the text corresponding to the user request. For each application, related words may be pre-stored in the memory. The natural language processing module 206 may determine the second application 207 by comparing the text corresponding to the user request with the related words pre-stored for each application.

Request information including any one or any combination of content data, intent information, and content information may be transmitted to the second application 207. The request information may be transmitted to the second application 207 in the form of a deep link.

When the user request is about sharing selected content data via email, the selected content data, content information, and intent information about attaching to an email may be transmitted to an email application.

When the user request is the user utterance 201 for attaching content data to an email, content data corresponding to the user utterance 201 may be determined, and identification information of the content data and intent information about attachment may be transmitted to the Gallery application.

Figure 3:
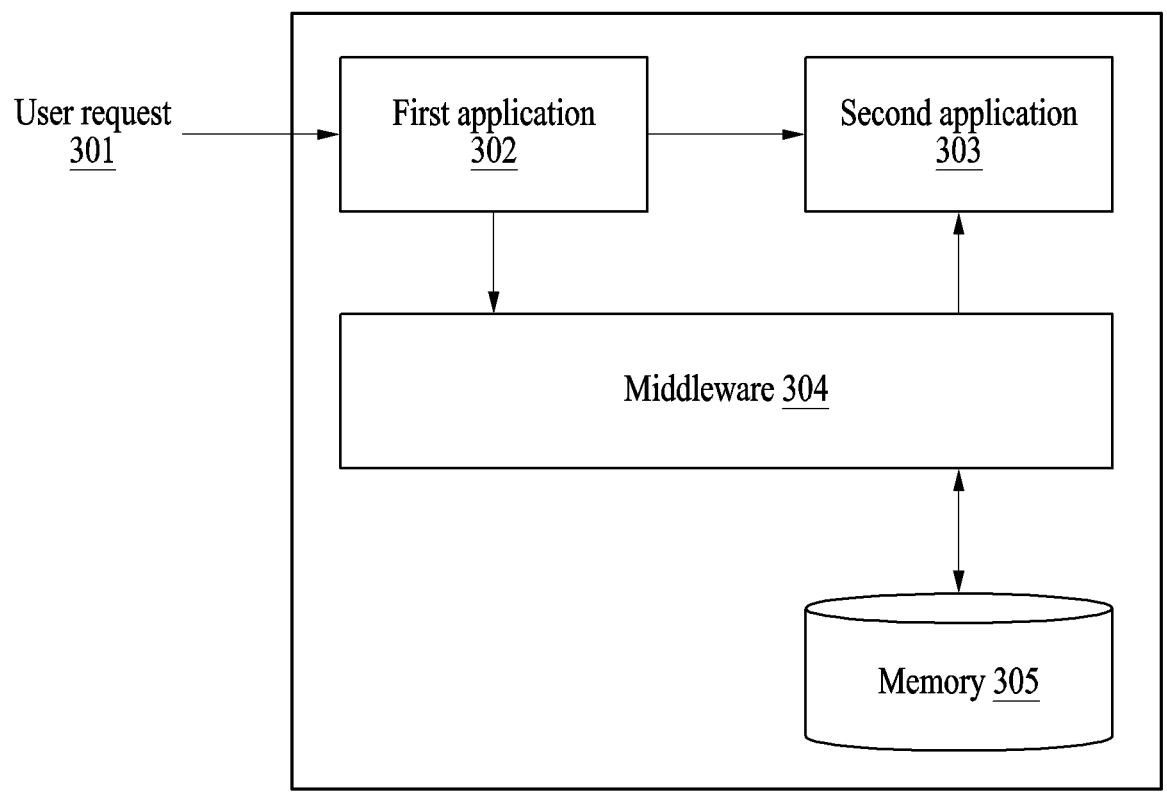
FIG. 3 illustrates an on-device AI service in an electronic device according to an embodiment.

FIG. 3 illustrates an on-device AI service in an electronic device according to an embodiment.

Referring to FIG. 3, when a first application 303 is executed in the electronic device and a user request 301 is received through an input module or a display module, the electronic device may perform natural language processing for the user request 301 using middleware 304, determine a second application 303 to process the user request 301, and transmit a result of performing natural language processing to the second application 303.

Text corresponding to the user request 301 and request information of the user request 301 may be mapped and stored in a memory 305, For example, the text corresponding to the user request 301 and the content data and request information for the user request 301 mapped to the text corresponding to the user request 301 may be stored in the memory 305. A processor may determine content data and generate request information, without separate natural language processing, by comparing a text corresponding to a new user request 301 and a text corresponding to a pre-stored user request 301, thereby increasing the processing efficiency, FIGS. 4A, 4B, 4C, 4D, 4E, 4F and 4G illustrate an on-device AI service according to an embodiment. For example, the operations performed in FIGS. 4A to 4G may be processed by a processor using modules (e.g., an ASR module and a natural language module) included in middleware 400 (e.g., the middleware 144 of FIG. 1).

Figure 4A:
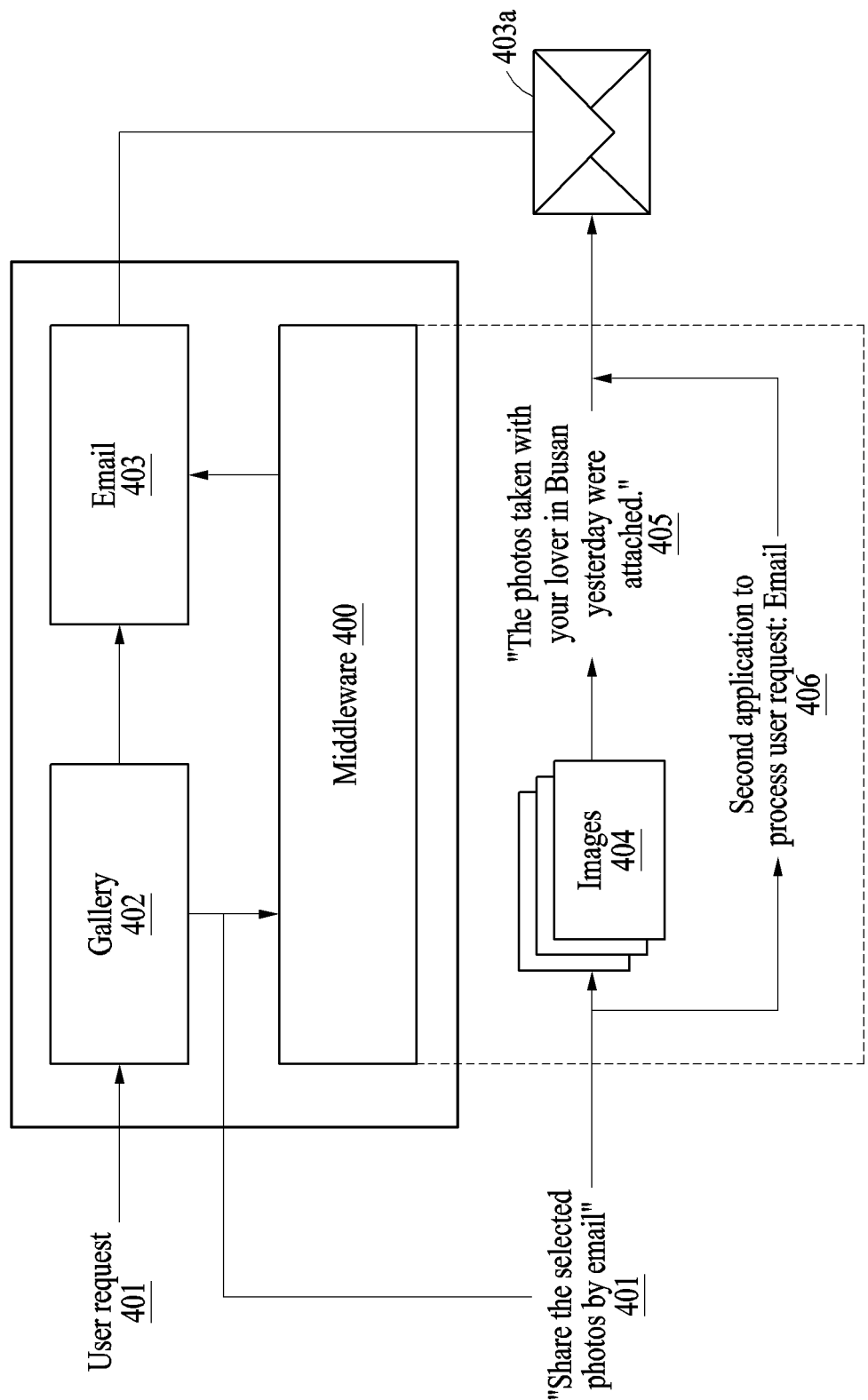
FIGS. 4A, 4B, 4C, 4D 4F and 4G illustrate an on-device AI service according to an embodiment.

Referring to FIG. 4A, a user request 401 "Share the selected photos by email" is processed, wherein a first application a Gallery application 402 for managing images 404 and a second application is an Email application 403.

The user request 401 may be received by the electronic device through a text input, a user utterance, or a button included in an interface of the first application 402 after the images 404 are specified by the user.

The processor may determine the images 404 specified by the user to be content data. The Gallery application 402 of FIG. 4A may have an option set to generate common information of a plurality of images 404 when the plurality of images 404 are shared by the Email application 403.

The processor may generate the common information of the plurality of images 404 as content information, and process the content information to generate a sentence 405 "The photos taken with your lover yesterday in Busan were attached."

The processor may recognize "email" as text associated with the Email application 403 in the text corresponding to the user request 401, and determine the Email application 403 to process the user request 401 in operation 406.

The processor may transmit the images 404 specified by the user, the processed sentence 405, and intent information about "sharing" to the Email application 403. In an Email 403a, the images 404 may be attached according to the received intent information, and the processed sentence 405 may be automatically generated.

Figure 4B:
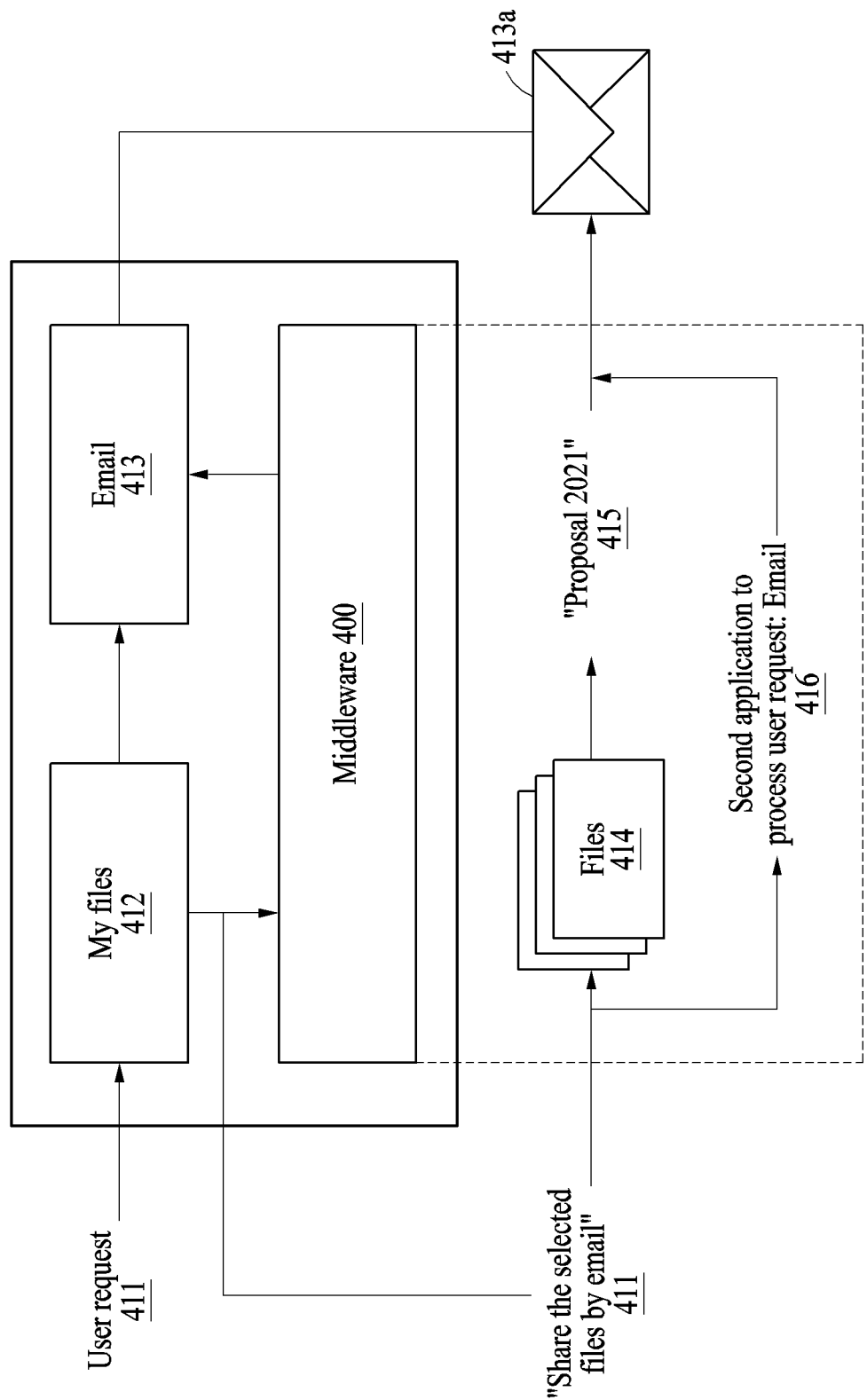

Referring to FIG. 4B, a user request 411 "Share the selected files by email" is processed, wherein a first application is a My Files application 412 for managing files, such as documents, images, audio files, and execution files, and a second application is an Email application 413.

In FIG. 4B, the user request 411 may be received by the electronic device through a text input, a user utterance, or a button included in an interface of the My Files application 412 after files 414, such as documents, are specified by the user.

The processor may determine the files 414 specified by the user to be content data. The My Files application 412 of FIG. 4B may have an option set to generate summary information of a file 414 when the file 414 is shared by the Email application 413. The processor may generate the summary information of the files 414 as content information, la and process the content information to generate a sentence 415 "Proposal 2021."

The processor may recognize "email" as text associated with the Email application 413 in the text corresponding to the user request 411, and determine the Email application 413 to process the user request 411, in operation 416.

The processor may transmit the files 414 specified by the user, the processed sentence 415, and intent information about "sharing" to the Email 413 application. In an Email 413a, the files 414 may be attached according to the received intent information, and the processed sentence 415 may be automatically generated.

Figure 4C:
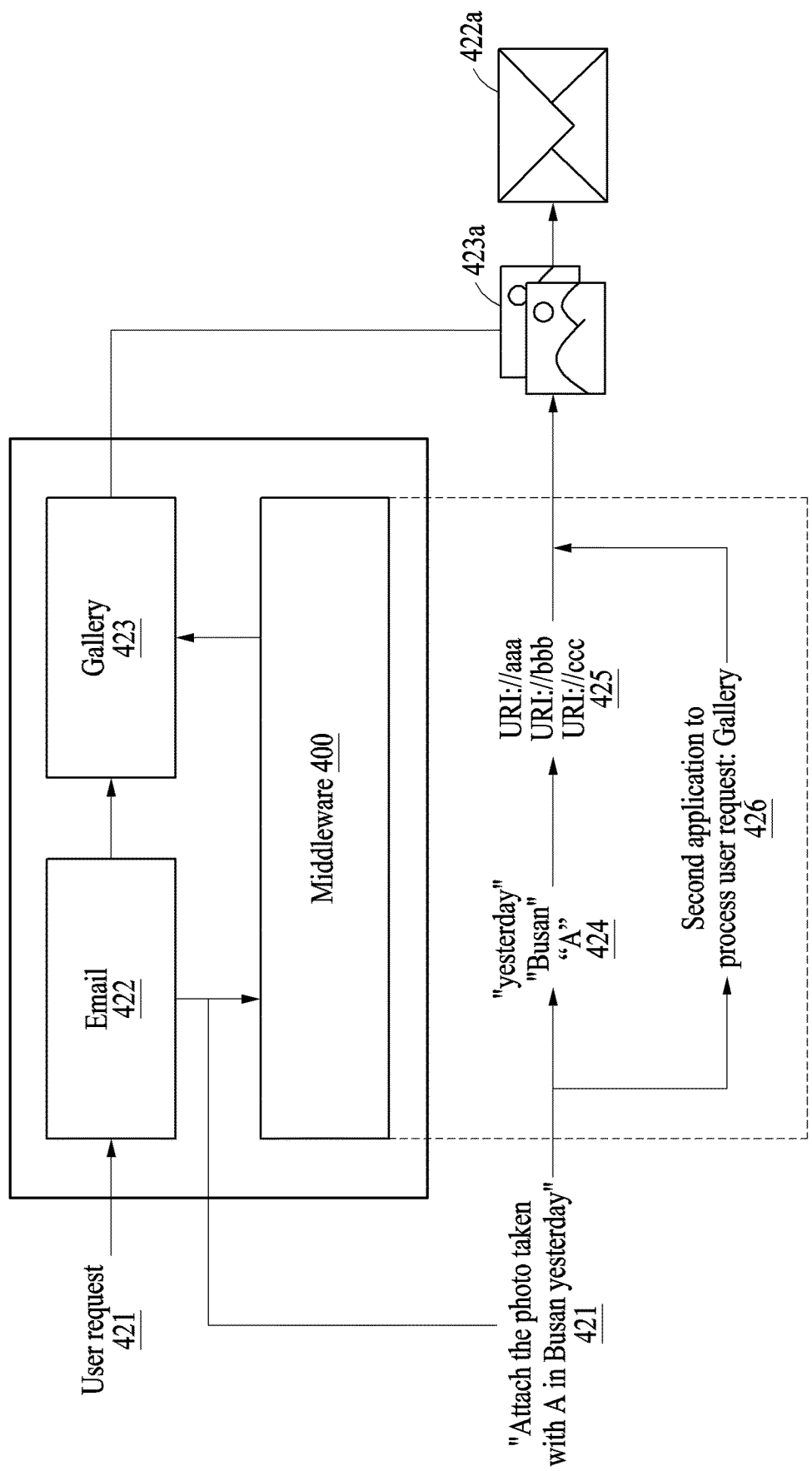

Referring to FIG. 4C, a user request 421 "Attach the photo taken with A yesterday in Busan" is processed, wherein a first application is an Email application 422 and a second application is a Gallery application 423.

The user request 421 may be received by the electronic device through a text input, a user utterance, or a button included in an interface of the Email application 422.

The processor may determine text 424 related to content data in the text corresponding to the user request 421. For example, the processor may determine the text 424 associated with the content data by comparing the text corresponding to the user request 421 with pre-stored content information.

The processor may classify the text corresponding to the user request 421 and determine intent information corresponding to the user request 421, by inputting the text corresponding to the user request 421 to an AI model trained to classify an input text and determine intent information of the input text.

In FIG. 4C, "yesterday", "Busan", and "A" may be identified as text 424 related to the content data, and a type of content may be determined to be an image according to "photo". The processor may determine the content data by comparing the text 424 related to the content data with property information and details information of the content data.

The Email application 422 may be set to transmit identification information 425 of content data to the Gallery application 423 when a request for attaching content data occurs according to a user utterance. The processor may transmit the identification information 425 of the determined content data to the Gallery application 423.

The processor may recognize "photo" as text associated with the Gallery application 423 in the text corresponding to the user request 421 and determine the Gallery application 423 to process the user request 421, in operation 426.

The processor may transmit intent information about "attaching" and the identification information 425 of the content data to the Gallery application 423. The processor may attach the content data 423a received from the Gallery application 423 to an email 422a based on the identification information 425 of the content data 423a.

Figure 4D:
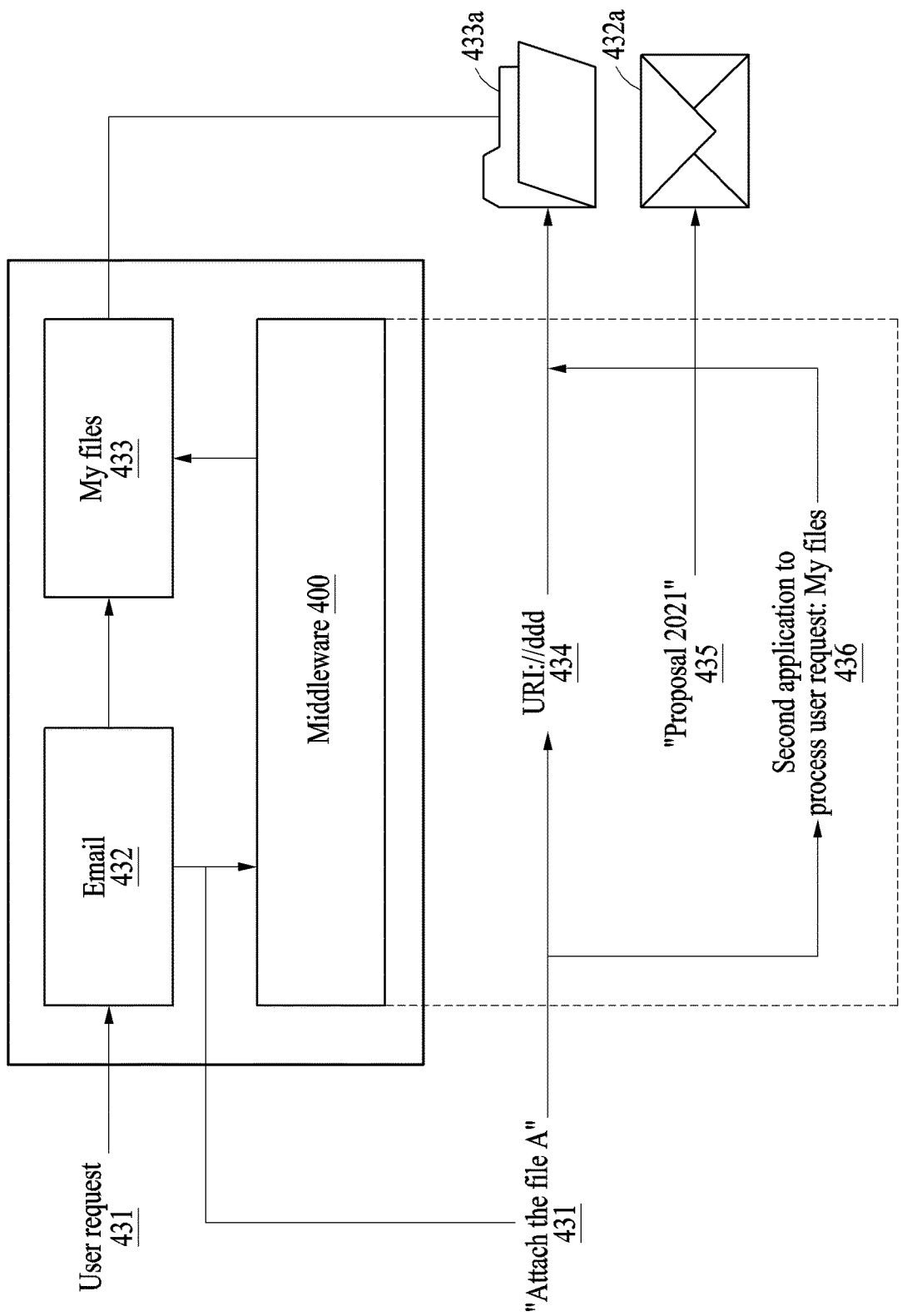

Referring to FIG. 4D, a user request 431 "Attach the file A" is processed, wherein a first application is an Email application 432 and a second application is a My Files application 433.

The user request 431 may be received by the electronic device through a text input, a user utterance, or a button included in an interface of the Email application 432.

The processor may determine text related to content data in the text corresponding to the user request 431. In FIG. 4D, the text related to the content data may be "file A". For example, the processor may determine "file A" as the text associated with the content data by comparing the text corresponding to the user request 431 with pre-stored content information.

To retrieve the file A, the processor may transmit identification information 434 of the determined content data to the My Files application 433, and transmit the detail information 435 of the determined content data to the Email application 432.

The processor may recognize "file" as text associated with the My Files application 433 in the text corresponding to the user request 431, and determine the My Files application 433 to process the user request 43:1, in operation 436.

The processor may transmit intent information about "attaching" and the identification information 434 of the content data to the My Files application 433. The processor may attach the content data 433a (e.g., the file A) retrieved from the My Files application 433 to an email 432a based on the identification information 434 of the content data.

Figure 4E:
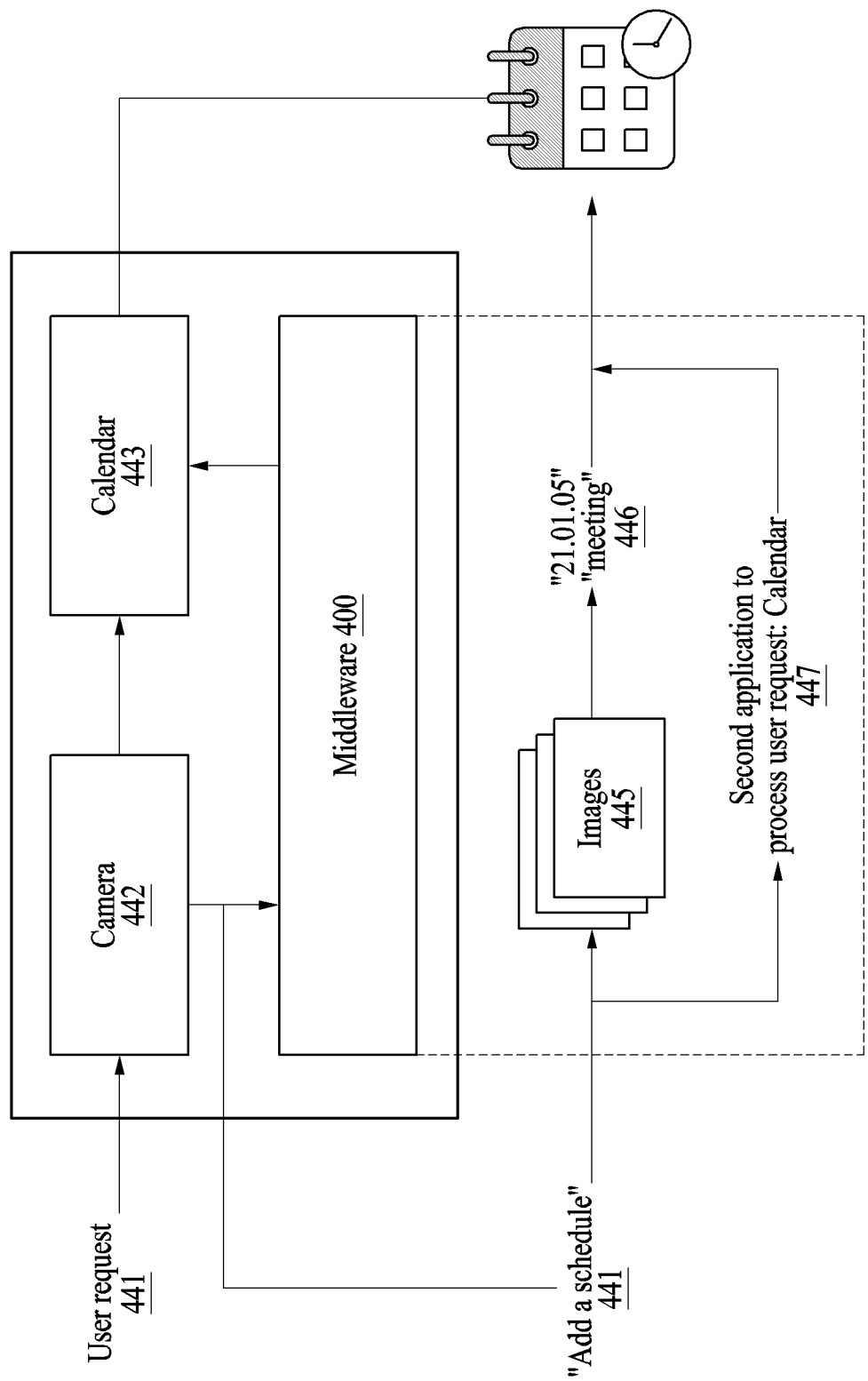

Referring to FIG. 4E, a user request 441 "Add a schedule" is processed, wherein a first application is a Camera application 442 and a second application is a. Calendar application 443.

The user request 441 may be received by the electronic device through a text input, a user utterance, or a button included in an interface of the Camera application 442 after previously captured images or videos 445 are specified.

The processor may determine the images or videos 445 specified by a user to be content data. The Camera application 442 may be set to generate a date of creation, which is property information of a content image, and summary information, which is detail information of the content image, when there is a user request for adding a schedule. The processor may extract property information and detail information 446 of the images or videos 445 from a memory.

The processor may recognize "schedule" as text associated with the Calendar application 443 in the text corresponding to the user request 441, and determine the Calendar application 443 to process the user request 441, in operation 447.

The processor may transmit the images or videos 445, the content information 446, and intent information for "adding" to the Calendar application 443. In the Calendar application 443, a schedule may be automatically added according to the received content information 446.

Referring to FIG. 4F, a user request 451 "Turn on the flashlight" is processed, wherein a first application is a Camera application 452 and a second application is a Flashlight application 453.

The user request 451 may be received by the electronic device through a text input, a user utterance, or a button included in an interface of the Camera application 452.

The processor may recognize "flashlight" as text associated with the Flashlight application 453 in the text corresponding to the user request 451, and determine the Flashlight application 453 to process the user request 451, in operation 454.

The processor may determine the Flashlight application 453 based on intent information generated using an AI model trained to determine intent information with respect to input text. The processor may analyze the text corresponding to the user request 451 to determine intent information about "turning on". The processor may transmit the intent information about "turning on" to the Flashlight application 453. While the Camera application 452 is in operation, the Flashlight application 453 may be executed to tam on the Flashlight 453a.

Figure 4G:
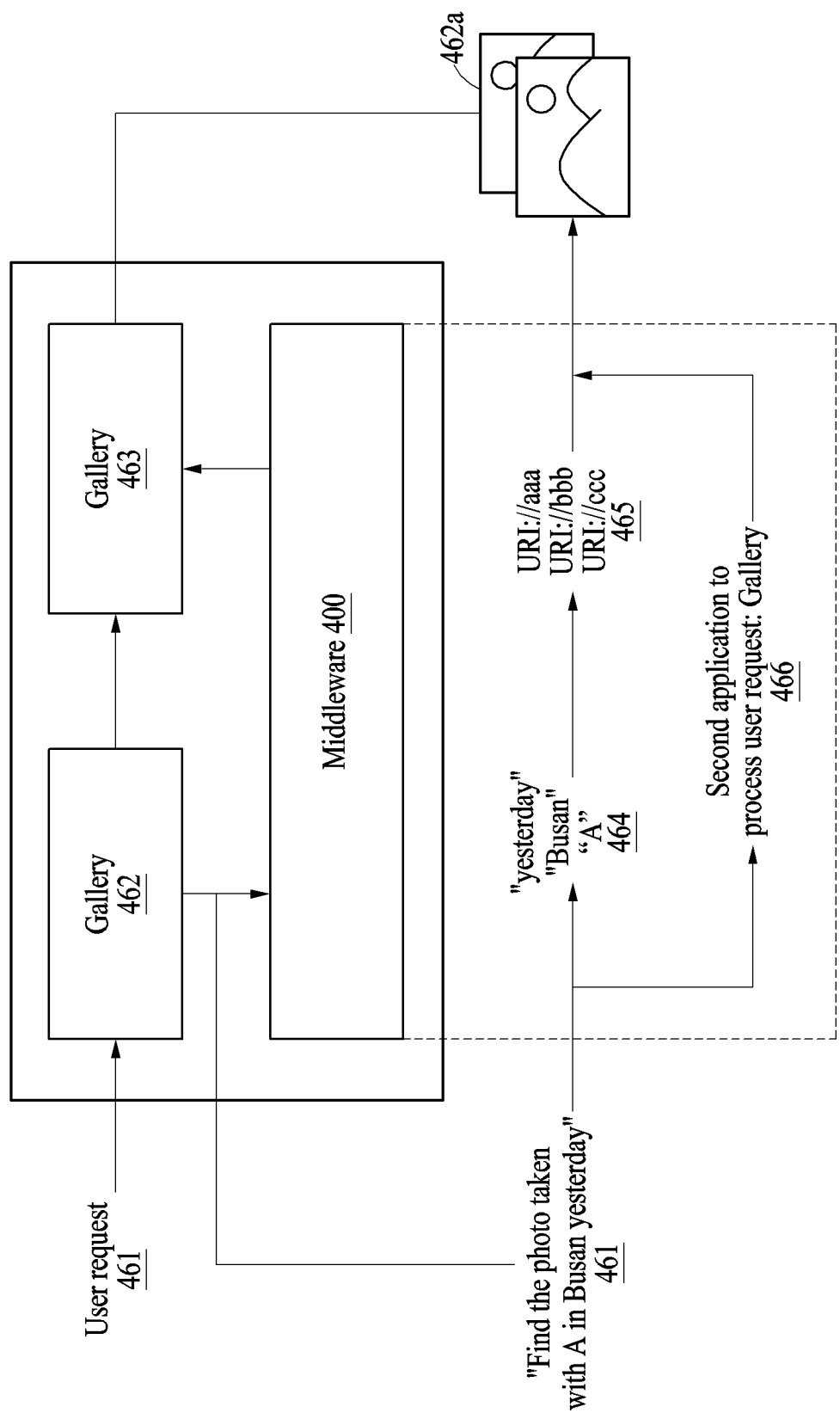

Referring to FIG. 4G, a user request 461 "Find the photo taken with A in Busan yesterday" is processed, wherein a first application is a Gallery application 462 and a is second application is also a Gallery application 463.

The user request 461 may be received by the electronic device through a text input, a user utterance, or a button included in an interface of the Gallery application 462.

The processor may determine text 464 related to content data in the text corresponding to the user request 461. For example, the processor may determine the text 464 associated with the content data by comparing the text corresponding to the user request 461 with pre-stored content information.

The processor may classify the text corresponding to the user request 461 and determine intent information corresponding to the user request 461, by inputting the text corresponding to the user request 461 to an AI model trained to classify an input text and determine intent information of the input text.

In FIG. 4G, "yesterday", "Busan", and "A" may be determined as text 464 related to the content data, and the content data may be determined to be an image according to "photo". The processor may determine the content data by comparing the text 464 related to the content data with property information and details information of the content data.

The processor may recognize "photo" as text associated with the Gallery application 463 in the text corresponding to the user request 461 and determine the Gallery application 463 to process the user request 461, in operation 466.

The processor may extract identification information of the determined content data from the memory. The processor may transmit intent information about "searching" and identification information 465 of the content data to the Gallery application 463. The processor may display images corresponding to the user request 461 in a Gallery 462a, based on the identification information 465 of the content data.

Figure 5:
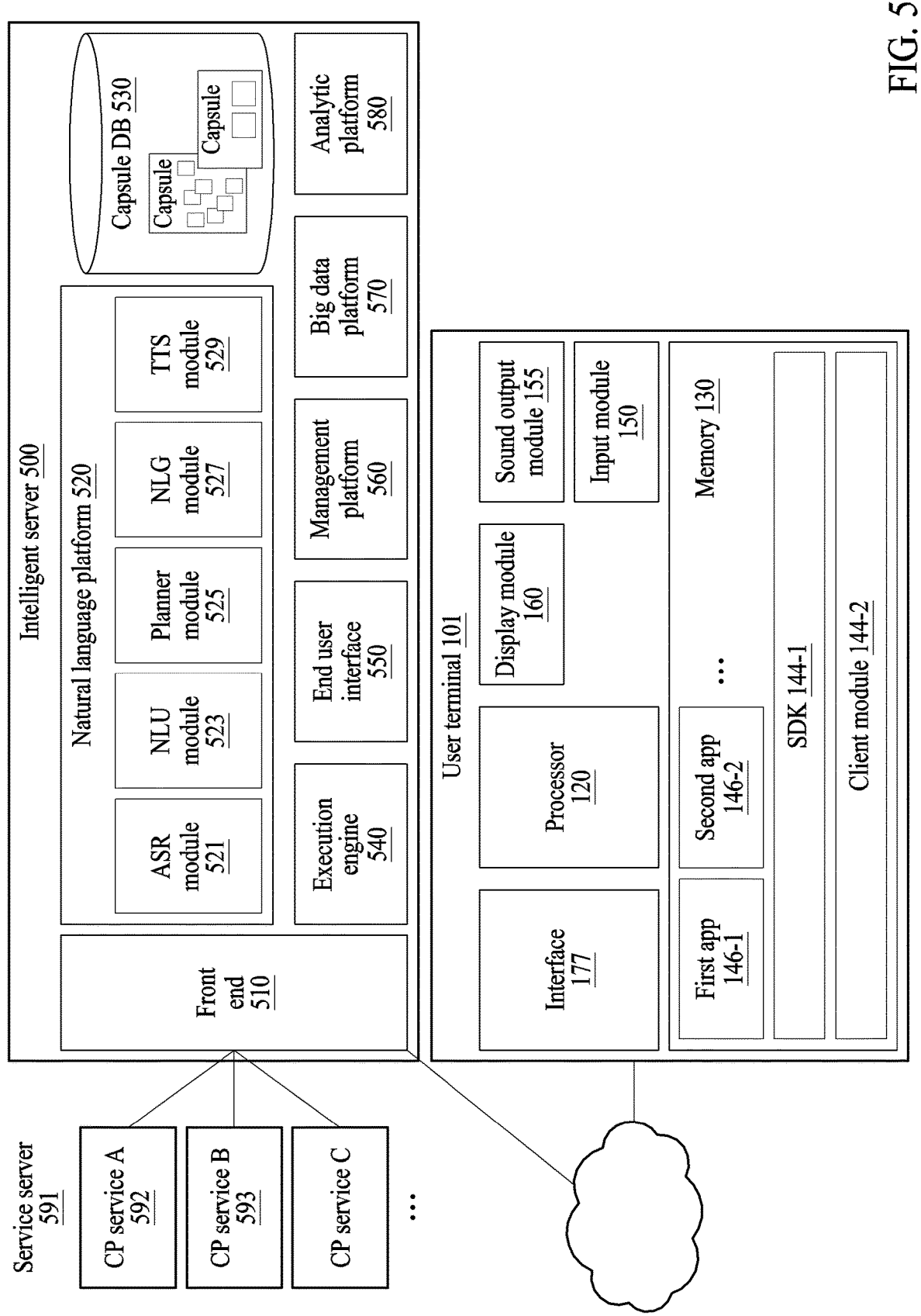
FIG. 5 illustrates an integrated intelligence system according to an embodiment.

FIG. 5 illustrates an integrated intelligence system according to an embodiment.

Referring to FIG. 5, an integrated intelligence system includes a user terminal 101, an intelligent server 500, and a service server 591.

The user terminal 101 may be connectable to the Internet, and may be a mobile phone, a smartphone, a personal digital assistant (PDA), a notebook computer, a television (TV), a home appliance, a wearable device, a head-mounted display (HMD), or a smart speaker.

The user terminal 101 includes a communication interface I, an input module 150, a sound output module 155, a display 160, a memory 130, and a processor 120. The components listed above may be operationally or electrically connected to each other.

The communication interface 177 may be connected to an external device and configured to transmit and receive data to and from the external device. The input module 150 may receive a sound (e.g., a user utterance) and convert the sound into an electrical signal. The sound output module 155 may output the electrical signal as a sound (e.g., a speech). The display 160 may be configured to display an image or video. The display 160 may also display a graphical user interface (GUI) of an application being executed.

The memory 130 stores a client module 144_2, a software development kit (SDK) 144_1, and a plurality of applications 146. The client module 1442 and the SDK 144_1 may configure a framework (or a solution program) for performing general-purpose functions. The client module 144_2 or the SDK 144_1 may configure a framework for processing a voice input.

The applications 146 may be programs for performing designated functions. The applications 146 may include a first application 146_1, a second application 146_2, etc, Each of the applications 146 may include a plurality of actions for performing a designated function. For example, the applications may include an alarm app, a messaging app, and/or a scheduling app. The applications 146 may be executed by the processor 120 to sequentially execute at least a portion of the plurality of actions.

The processor 120 may control the overall operation of the user terminal 101. For example, the processor 120 may be electrically connected to the communication interface 177, the input module 150, the sound output module 155, and the display 160 to perform a designated operation.

The processor 120 may also perform the designated function by executing the program stored in the memory 130, For example, the processor 120 may execute at least one of the client module 144_2 or the SDK 144_1 to perform the following operation for processing a voice input. The processor 120 may control the actions of the applications 146 through, for example, the SDK 144_1.

The following operations described with the reference to the client module 1442 or the SDK 144_1 may be an operation by the execution by the processor 120.

The client module 1442 may receive a voice input, e.g., a voice signal corresponding to a user utterance sensed through the input module 150. The client module 144_2 may transmit the received voice input to the intelligent server 500. The client module 144_2 may transmit state information of the user terminal 101 together with the received voice input to the intelligent server 500. The state information may be execution state information of an application.

The client module 144_2 may receive a result corresponding to the received voice input. For example, when the intelligent server 500 is capable of calculating a result corresponding to the received voice input, the client module 144_2 may receive the result corresponding to the received voice input. The client module 144_2 may display the received result on the display 160.

The client module 144_2 may receive a plan corresponding to the received voice input. The client module 144_2 may display results of executing a plurality of actions of an application according to the plan on the display 160. The client module 144_2 may sequentially display the results of executing the plurality of actions on the display, or may display only a partial result of executing the plurality of actions (e.g., a result of the last action) on the display.

The client module 144_2 may receive a request for obtaining information for calculating a result corresponding to the voice input from the intelligent server 500. The client module 144_2 may transmit the obtained information to the intelligent server 500, in response to the request.

The client module 144_2 may transmit information on the results of executing the plurality of actions according to the plan to the intelligent server 500. The intelligent server 500 may confirm that the received voice input has been correctly processed using the information on the results.

The client module 144_2 may include a speech recognition module. The client module 144_2 may recognize a voice input for performing a limited function a through the speech recognition module. For example, the client module 144_2 may execute an intelligent application for processing a voice input to performing an organic operation through a designated input (e.g., Wake up!).

The intelligent server 500 may receive information related to a user voice input from the user terminal 101 through a communication network. The intelligent server 500 may change data related to the received voice input into text data. The intelligent server 500 may generate a plan for performing a task corresponding to the user voice input based on the text data.

The plan may be generated by an AI system. The AI system may be a rule-based system or a neural network-based system (e.g., a feedforward neural network (FNN) or an RNN). Alternatively, the AI system may be a combination thereof or other AI systems.

The plan may be selected from a set of predefined plans or may be generated in real time in response to a user request. For example, the AI system may select at least one plan from among the predefined plans.

The intelligent server 500 may transmit a result according to the generated plan to the user terminal 101 or transmit the generated plan to the user terminal 101. The user terminal 101 may display the result according to the plan on the display. The user terminal 101 may display a result of executing an action according to the plan on the display.

The intelligent server 500 includes a front end 510, a natural language platform 220, a capsule DB 530, an execution engine 510, an end user interface 550, a management platform 560, a big data platform 570, and an analytic platform 580.

The front end 510 may receive the received voice input from the user terminal 101. The front end 510 may transmit a response corresponding to the voice input.

The natural language platform 520 includes an ASR module 521, a natural language understanding (NLU) module 523, a planner module 525, a natural language generator (NLG) module 527, and a text-to-speech (TTS) module 529.

The ASR module 521 may convert the voice input received from the user terminal 101 into text data. The NLU module 523 may discern an intent of a user using the text data of the voice input. For example, the NLU module 523 may discern the intent of the user by performing syntactic analysis or semantic analysis. The NLU module 523 may discern the meaning of a word extracted from the voice input using a linguistic feature (e.g., a grammatical element) of a morpheme or phrase, and determine the intent of the user by matching the discerned meaning of the word to an intent.

The planner module 525 may generate a plan using a parameter and the intent determined by the NLU module 523. The planner module 525 may determine a plurality of domains required to perform a task based on the determined intent. The planner module 525 may determine a plurality of actions included in each of the plurality of domains determined based on the intent. The planner module 525 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user.

The planner module 525 may also determine a relationship between the plurality of actions and the plurality of concepts stepwise (or hierarchically). For example, the planner module 525 may determine an execution order of the plurality of actions determined based on the intent of the user, lased on the plurality of concepts. That is, the planner module 525 may determine the execution order of the plurality of actions based on the parameter required for the execution of the plurality of actions and results output by the execution of the plurality of actions. Accordingly, the planner nodule 525 may generate a plan including connection information (e.g ontology) between the plurality of actions and the plurality of concepts.

The planner module 525 may generate the plan using information stored in the capsule DB 530 that stores a set of relationships between concepts and actions.

The NLG module 527 may change designated information into a text form. The information changed to the text form may be in the form of a natural language utterance.

The TTS module 529 may change information in a text form into information in a speech form.

Alternatively, some or all of the functions of the natural language platform 220 may be implemented in the user terminal 101 as well.

The capsule DB 530 may store information on the relationship between the plurality of concepts and actions corresponding to the plurality of domains, Herein, a capsule may include a plurality of action objects (or action information) and concept objects (or concept information) included in the plan. The capsule DB 530 may store a plurality of capsules in the form of a concept action network (CAN). The plurality of capsules may be stored in a function registry included in the capsule DB 530.

The capsule DB 530 may include a strategy registry that stores strategy information necessary for determining a plan corresponding to a voice input. The strategy information may include reference information for determining one plan when there are a plurality of plans corresponding to the voice input. The capsule DB 530 may include a follow-up registry that stores information on follow-up actions for suggesting a follow-up action to the user in a designated situation. The follow-up action may include a follow-up utterance.

The capsule DB 530 may include a layout registry that stores layout information of information output through the user terminal 101. The capsule DB 530 may include a vocabulary registry that stores vocabulary information included in capsule information. The capsule DB 530 may include a dialog registry that stores information on a dialog (or an interaction) with the user.

The capsule DB 530 may update the stored objects through a developer tool. The developer tool may include a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition, Additionally or alternatively, the capsule DB 530 may be implemented in the user terminal 101 as well.

The execution engine 540 may calculate a result using the generated plan. The end user interface 550 may transmit the calculated result to the user terminal 101. Accordingly, the user terminal 101 may receive the result and provide the received result to the user.

The management platform 560 may manage information used by the intelligent server 500. The big data platform 570 may collect data of the user. The analytic platform 580 may manage a quality of service (QoS) of the intelligent server 500. For example, the analytic platform 580 may manage the components and processing rate (or efficiency) of the intelligent server 500.

The service server 591 may provide a designated service (e.g., food order or hotel reservation) to the user terminal 101. The service server 591 may be a server operated by a third party. The service server 591 may provide information to be used for generating a plan corresponding to the received voice input to the intelligent server 500. The provided information may be stored in the capsule DB 530. In addition, the service server 591 may provide result information according to the plan to the intelligent server 500.

In the integrated intelligence system described above, the user terminal 101 may provide various intelligent services to the user in response to a user input. The user input may include an input through a physical button, a touch input, or a voice input.

The user terminal 101 may provide a speech recognition service through an intelligent application (o a speech recognition application) stored therein. For example, the user terminal 101 may recognize a riser utterance or a voice input received through the microphone, and provide a service corresponding to the recognized voice input to the user.

The user terminal 101 may perform a designated action alone or together with the intelligent server and/or a service server, based on the received voice input. For example, the user terminal 101 may execute an application corresponding to the received voice input and perform a designated action through the executed app.

When the user terminal 101 provides a service together with the intelligent server 500 and/or the service server, the user terminal 101 may detect a user utterance using the input module 150 and generate a signal (or voice data) corresponding to the detected user utterance. The user terminal 101 may transmit the speech data to the intelligent server 500 using the communication interface 177.

The intelligent server 500 may generate, as a response to the voice input received from the user terminal 101, a plan for performing a task corresponding to the voice input or a result of performing an action according to the plan. The plan may include a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality; of actions and the plurality of concepts.

The user terminal 101 may receive the response using the communication in efface 177. The user terminal 101 may output a speech signal generated in the user terminal 101 to the outside using the sound output module 155, or output an image generated in the user terminal 101 to the outside using the display 160.

Figure 6:
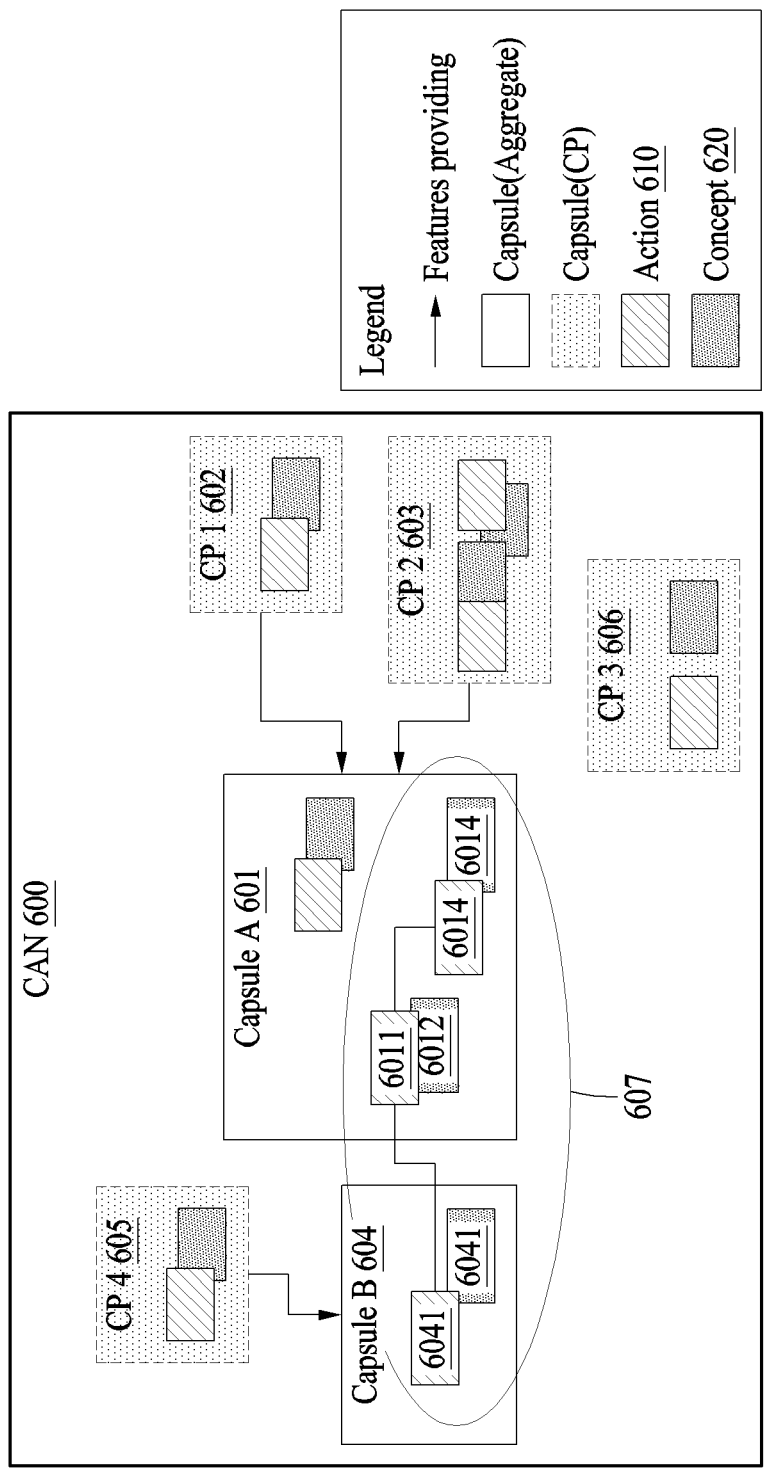
FIG. 6 illustrates a storage of relationship information between concepts and actions in a database (DB) according to an embodiment.

FIG. 6 illustrates a storage of relationship information between concepts and actions in a DB according to an embodiment.

Referring to FIG. 6, a capsule DB of an intelligent server may store capsules form of a CAN 600. The capsule DB may store an action for processing a task corresponding to a voice input of a user and a parameter for the action in the form of a CAN.

The capsule DB may store a plurality of capsules (e.g., capsule A 601 and capsule B 604) respectively corresponding to a plurality of domains applications). The capsule A 601 may correspond to one domain (e.g., a location (geo) or an application). Further, capsule A 601 may correspond to at least one service provider (e.g., CP 1 602 or CP 2 603) for performing a function for a domain related to the capsule. The capsule A 601 includes at least one action 610 for performing a designated function and at least one concept 620.

The natural language platform may generate a plan for performing a task corresponding to the received voice input using the capsules stored in the capsule DB. For example, a planner module of the natural language platform may generate the plan using the capsules stored in the capsule DB. For example, a plan 607 may be generated using actions 6011 and 6013 and concepts 6012 and 6014 of the capsule A 610 and an action 6041 and a concept 6042 of the capsule B 604.

Figure 7:
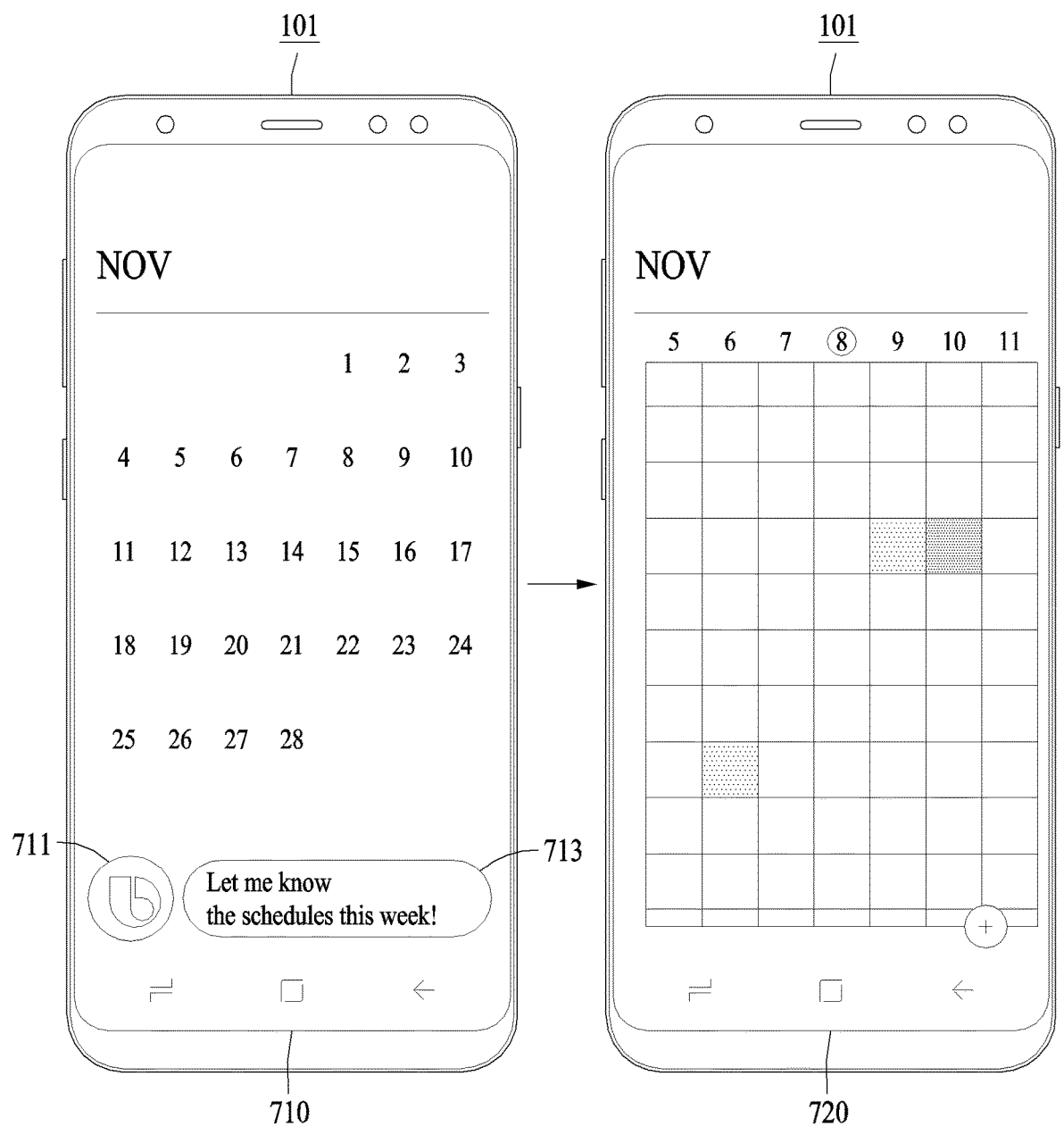
FIG. 7 illustrates a user terminal displaying a screen for processing a received voice input through an intelligent application, according to an embodiment.

FIG. 7 illustrates a screen of a user terminal processing a received voice input through an intelligent application according to an embodiment.

Referring FIG. 7, the user terminal 101 may execute an intelligent application to process a user input through an intelligent server.

On a screen 710, when a designated voice input (e.g., Wake up!) is recognized or an input through a hardware key (e.g., a dedicated hardware key) is received, the user terminal 101 may execute an intelligent application for processing the voice input. The user terminal 101 may execute the intelligent application while a scheduling application is executed. The user terminal 101 may display an object (e.g., an icon) 711 corresponding to the intelligent app on the display.

The user terminal 101 may receive a voice input by a user utterance. For example, the user terminal 101 may receive a voice input of "Let me know the schedules this week!". The user terminal 101 may display a user interface (UI) 713 (e.g., an input window) of the intelligent application in which text data of the received voice input is entered on the display.

On a screen 720, the user terminal 101 may display a result corresponding to the received voice input on the display. For example, the user terminal 101 may receive a plan corresponding to the received user input, and display "the schedules this week" on the display according to the plan.

According to an embodiment, an electronic device may include an input module for receiving a command or data to be used in the electronic device from the outside of the electronic device, a display module for providing information to the outside of the electronic device, a processor electrically connected to the input module and the display module, and a memory electrically connected to the processor and including a first application, wherein when the first application is executed, the processor may receive a user request from the input module or the display module, determine content data associated with the user request, generate request information corresponding to the user request based on the content data, determine a second application to process the user request, and transmit the request information to the second application.

When the user request 301 is received through a microphone of the input module, the processor may extract a text corresponding to the user request through speech recognition on the received user request and determine the content data based on the extracted text.

When the user request is received through a touch panel of the display module, the processor may determine a text corresponding to the user request and determine the content data based on the text.

At least one of the first application and the second application may operate offline.

To determine the content data, the processor may extract a text corresponding to the user request and determine the content data based on a text related to the content data in the text.

The request information may include content information related to the content data, and the content information may include any one or more of details information of the content data, identification information of the content data, property information of the content data, and if the content data are multiple, common information of the multiple content data.

In the first application, the processor may determine the content information based on a preset option according to the user request.

The processor may process the content information using an AI model trained to generate a sentence based on an input keyword.

The request information may include intent information that is information about an action to be performed in the second application, and the processor may determine the intent information from a text corresponding to the user information using an AI model trained to determine intent information with respect to an input text.

The memory may store the text corresponding to the user request and the content data and request information for the user request mapped to the text corresponding to the user request, and the processor may determine the content data by comparing a new user request with a pre-stored user request and generate the request information.

According to an embodiment, an electronic device may include an input module for receiving a command or data to be used in the electronic device from the outside of the electronic device, a display module for providing information to the outside of the electronic device, a processor electrically connected to the input module and the display module, and a memory electrically connected to the processor and including a first application.

When the first application is executed, the processor may receive a user request from the input module or the display module, analyze the user request using an AI model trained to perform natural language processing, determine a second application to process the user request based on a result of analyzing the user request, and process the user request through the second application.

When the user request i received through a microphone of the input module, the processor may extract a text corresponding to the user request through speech recognition on the received user request and analyze the user request based on the extracted text.

When the user request is received through a touch panel of the display module, the processor may determine a text corresponding to the user request and analyze the user request based on the text.

The processor may determine the second application based on intent information generated using an AI model trained to determine intent information from a text corresponding to the user request.

According to an embodiments, an on-device AI service method may include receiving a user request from the input module or the display module when a first application is executed, determining content data associated with the user request, generating request information corresponding to the user request based on the content data, determining a second application to process the user request, and transmitting the content data and the request information to the second application.

An electronic device according to an embodiment may be one of various types of electronic devices. The electronic device may include, for example, a portable communication device (e.g., a smartphone), a computer device, a portable multimedia device, a portable medical device, a camera, a wearable device, or a home appliance device. However, an electronic device is not limited to the above-described examples.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components.

It is to be understood that a singular form of a noun corresponding to an item may include one or more of the things, unless the relevant context clearly indicates otherwise.

As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof.

Terms such as "first", "second", or "first" or "second" may simply be used to distinguish the component from other components in question, and may refer to components in other aspects (e.g., importance or order) is not limited.

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other teems, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138)

that is readable by a machine (e.g., the electronic device 100 For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium.

Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. One or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Additionally, operations performed by the module, the program, or another component may be carried out sequentially, in parallel, repeatedly, or heuristically, or one or more of the operations may be executed in a different order or omitted, or one or more other operations may be added.

According to the above-described embodiments, it is possible to provide an electronic device and method for providing an on-device AI service using modules included in middleware, thereby providing an on-device AI service for an application that may operate offline without interoperation with a server or interoperation with a VA.

Additionally, it is possible to provide an electronic device and method that is not required to process an operation for domain classification or to store a separate AI model for each application and thus, may be advantageous in terms of system complexity or storage space.

It is also possible to recognize an accurate meaning and process a user request even if various modifications are made to a text corresponding to the user request.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   an input module configured to receive a command or data;
   a display module;
   a memory storing a first application; and
   a processor configured to:
     receive, from the input module or the display module, a user request, while the first application is executed,
     determine content data associated with the user request,
     generate request information corresponding to the user request based on the content data,
     determine a second application to process the user request, and
     transmit the request information to the second application,
   wherein the request information includes intent information about an action to be performed in the second application.

2. The electronic device of claim 1, wherein the processor is further configured to:
   when the user request is received through a microphone of the input module, extract text corresponding to the user request through speech recognition for the received user request, and
   determine the content data based on the extracted text.

3. The electronic device of claim 1, wherein the processor is further configured to:
   when the user request is received through a touch panel of the display module, determine text corresponding to the user request, and
   determine the content data based on the text.

4. The electronic device of claim 1, wherein at least one of the first application and the second application operates offline.

5. The electronic device of claim 1, wherein the processor is further configured to:
   extract text corresponding to the user request, and
   determine the content data based on text related to the content data in the extracted text.

6. The electronic device of claim 5, wherein the request information includes content information about the content data, and
   wherein the content information includes at least one of detail information of the content data, identification information of the content data, property information of the content data, or common information of multiple content data.

7. The electronic device of claim 6, wherein the processor is further configured to, in the first application, determine the content information based on a preset option according to the user request.

8. The electronic device of claim 6, wherein the processor is further configured to process the content information, using an artificial intelligence model trained to generate a sentence based on an input keyword.

9. The electronic device of claim 1, wherein the processor is further configured to determine the intent information from text corresponding to a user utterance, using an artificial intelligence model.

10. The electronic device of claim 1, wherein the memory stores the text corresponding to the user request and the content data and the request information for the user request mapped to the text corresponding to the user request, and wherein the processor is further configured to:
determine the content data by comparing a new user request with a pre-stored user request, and
generate the request information.

11. An electronic device, comprising:
an input module configured to receive a command or data;
a display module;
a memory storing a first application; and
a processor configured to:
  receive, from the input module or the display module, a user request, while the first application is executed,
  analyze the user request using an artificial intelligence (AI) model trained to perform natural language processing,
  determine a second application to process the user request based analyzing the user request, and
  process the user request through the second application,
wherein the processor is further configured to determine the second application based on intent information generated using an AI model trained to determine intent information from text corresponding to the user request, and
wherein the intent information includes information about an action to be performed in the second application.

12. The electronic device of claim 11, wherein the processor is further configured to:
  when the user request is received through a microphone of the input module, extract the text corresponding to the user request through speech recognition for the received user request, and
  analyze the user request based on the extracted text.

13. The electronic device of claim 11, wherein the processor is further configured to:
  when the user request is received through a touch panel of the display module, determine the text corresponding to the user request, and
  analyze the user request based on the determined text.

14. A method of providing an on-device artificial intelligence service, the method comprising:
  receiving a user request while a first application is executed;
  determining content data associated with the user request;
  generating request information corresponding to the user request based on the content data;
  determining a second application to process the user request; and
  transmitting the content data and the request information to the second application,
  wherein the request information includes intent information about an action to be performed in the second application.

* * * * *